(12) United States Patent
Mikat

(10) Patent No.: US 8,280,584 B2
(45) Date of Patent: Oct. 2, 2012

(54) CLIMATE CONTROL SYSTEM

(75) Inventor: Daniel C. Mikat, Milford, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 353 days.

(21) Appl. No.: 12/777,005

(22) Filed: May 10, 2010

(65) Prior Publication Data

US 2011/0272131 A1 Nov. 10, 2011

(51) Int. Cl.
*G06F 7/00* (2006.01)
(52) U.S. Cl. .......................................................... 701/36
(58) Field of Classification Search ...................... 701/36
See application file for complete search history.

(56) References Cited

U.S. PATENT DOCUMENTS

| 4,631,976 | A | 12/1986 | Noda et al. |
| 6,012,297 | A | 1/2000 | Ichishi et al. |
| 6,172,342 | B1 | 1/2001 | Khafagy et al. |
| 6,293,116 | B1 * | 9/2001 | Forrest et al. ................... 62/227 |
| 6,351,698 | B1 | 2/2002 | Kubota et al. |
| 6,392,195 | B1 | 5/2002 | Zhao et al. |
| 6,397,615 | B1 | 6/2002 | Kawai et al. |
| 7,187,292 | B2 | 3/2007 | Hayashi et al. |
| 2002/0110178 | A1 * | 8/2002 | Puranen et al. ................ 374/121 |
| 2010/0188343 | A1 * | 7/2010 | Bach .............................. 345/173 |
| 2011/0224875 | A1 * | 9/2011 | Cuddihy et al. ................. 701/42 |

FOREIGN PATENT DOCUMENTS

JP 2003148967 A 5/2003

* cited by examiner

*Primary Examiner* — Hussein A. ElChanti
(74) *Attorney, Agent, or Firm* — Gifford, Krass, Sprinkle, Anderson & Citkowski, P.C.

(57) ABSTRACT

A system for controlling the climate in a cabin space using the state of a user's hand is provided. The system includes a controller and a heating ventilation and air conditioning system (HVAC system). The HVAC system is operable to direct air into the cabin space so as to maintain a predetermined climate within the cabin space. The controller is operable to actuate and control the HVCAC system. The system further includes a handheld sensor operable to detect the state of the user's hand. The handheld sensor is in communication with the controller and transmits the state of the hand to the controller. The controller processes the state of the hand so as to calculate an HVAC system operating setting operable to optimize the user's comfort. The controller then actuates the HVAC system so as to execute the calculated heating ventilation and air conditioning system operating setting.

19 Claims, 5 Drawing Sheets

US 8,280,584 B2

CLIMATE CONTROL SYSTEM

FIELD OF THE INVENTION

The invention relates to a system for controlling the climate in a cabin space. More particularly, the invention relates to a system for controlling the climate in a cabin space having a handheld sensor operable to detect the state of a hand. The system processes the state of the hand so as to calculate a heating ventilation and air conditioning system operating setting operable to optimize the comfort of the user. The controller is further operable to actuate the heating ventilation and air conditioning system so as to execute the calculated heating ventilation and air conditioning system operating setting.

BACKGROUND OF THE INVENTION

Climate control systems for controlling the climate in a cabin space of a platform such as a vehicle are known and used. Some systems are controlled by a manual adjustment made by the user; however, attempts have been made to automatically control the ambient temperature of the cabin space. Such attempts require the use of sophisticated sensors for detecting the body heat of the user and using the body temperature of the user to adjust the vehicle's heating ventilation and air conditioning system. More specifically, sensors such as infrared sensors are known to be used to detect the temperature of the user's body. However, such sensors may be imprecise due to the climate conditions within the cabin space such as a foggy condition or the like. Accordingly, it remains desirable to have a system that automatically adjusts the climate within the cabin space using direct contact so as to mitigate the effects of climate features such as moisture and condensation.

SUMMARY OF THE INVENTION

According to one aspect of the invention, a system for controlling the climate in a cabin space using the state of a user's hand is provided. The system includes a controller and a heating ventilation and air conditioning system (HVAC system). The HVAC system is operable to direct air into the cabin space so as to maintain a predetermined climate within the cabin space. The controller is operable to actuate and control the HVAC system.

The system further includes a handheld sensor operable to detect the state of the user's hand. The handheld sensor is configured to be gripped by the user. The handheld sensor is in communication with the controller and transmits the state of the hand to the controller. The controller processes the state of the hand so as to calculate an HVAC system operating setting operable to optimize the user's comfort. The controller then actuates the HVAC system so as to execute the calculated heating ventilation and air conditioning system operating setting.

According to another embodiment of the invention, a method for controlling the climate in a cabin space is also provided. The method includes providing a sensor for detecting the state of a hand and providing a HVAC system operable to generate a predetermined climate within the cabin space. The method proceeds to the step of processing the state of the hand and calculating a desired HVAC system operating setting operable to optimize the user's comfort relative to the state of the user's hand. The method further includes the step of adjusting the HVAC system to the calculated HVAC system operating setting.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE INVENTION

Figure 1:
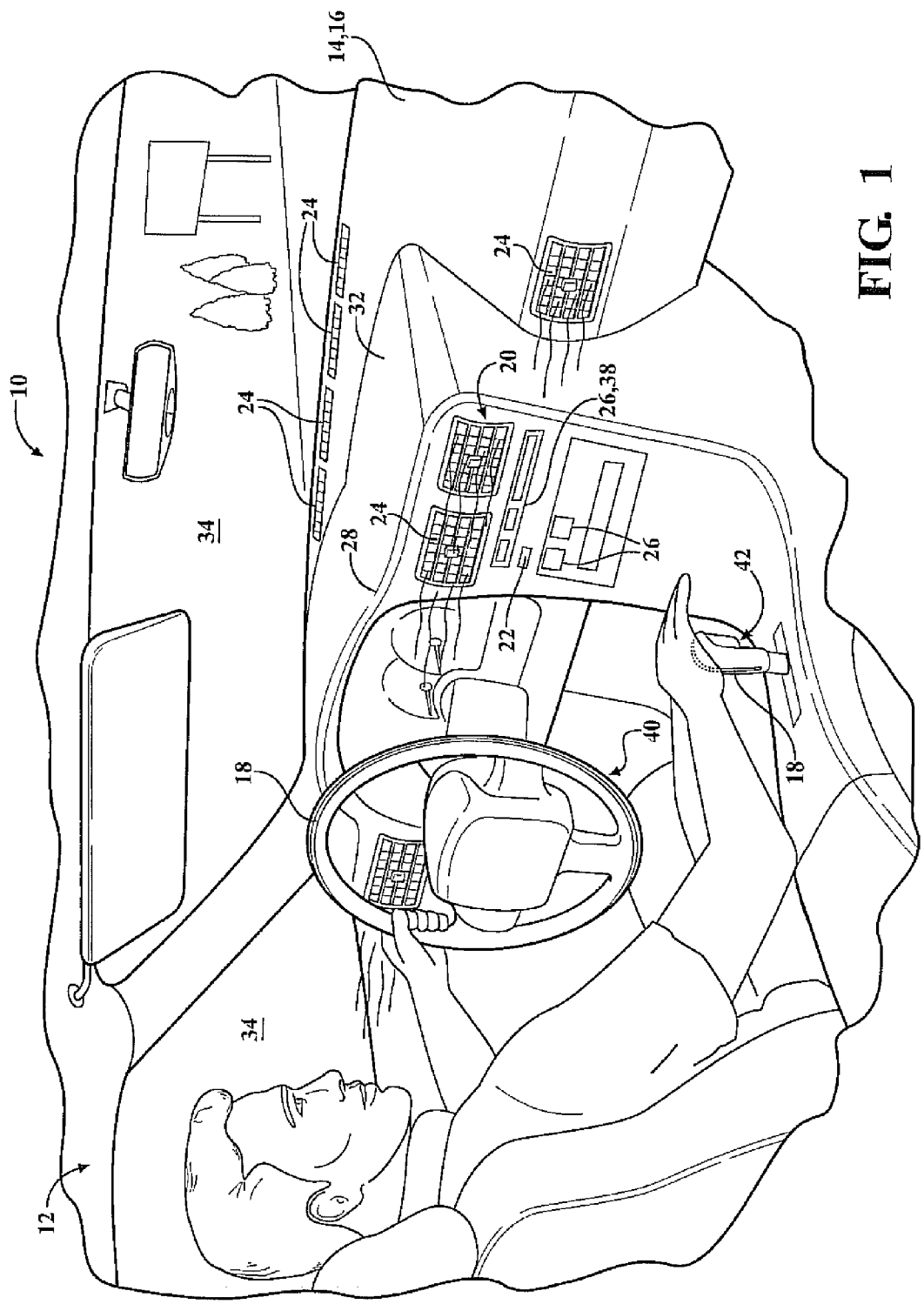
FIG. 1 is a perspective view of a cabin space of a vehicle.

Referring to FIGS. 1-9, a system 10 for controlling the climate in a cabin space 12 of a platform 14 so as to optimize the user's comfort is provided. Though the Figures show the system 10 integrated in the cabin space 12 of a vehicle 16, it should be appreciated that the system 10 may be integrated in other platforms 14 such as boats, trains, and airplanes. The system 10 includes a handheld sensor 18 operable to detect the state of a user's hand so as to adjust the HVAC system 20 to optimize the user's comfort.

The system 10 includes a controller 22 operable to actuate the HVAC system 20. HVAC systems 20 are currently known and used and include heating and air conditioning units in communication with a network of vents 24. HVAC systems 20 further include a fan 26 operable to adjust the flow of air into the cabin space 12. The vents 24 may have a plurality of openings leading into the cabin space 12. The openings are configured to direct heated/cooled air into predetermined areas of the cabin space 12. Some of the openings may be disposed on the instrument panel 28 so as to direct air towards the chest region of the user, other openings may be disposed adjacent the vehicle floor 30, while some openings may be disposed on the upper surface 32 of the instrument panel 28 so as to direct air towards the windows 34 so as to defrost or defog the windows 34.

The HVAC system 20 may further include inputs 36, such as a button 38, operable to establish a selected climate condition within the cabin space 12 of the vehicle 16. For instance, the user may actuate the button 38 to select a desired temperature, or to defog the windshield or side windows 34. The HVAC system 20 may also include a button 38 operable to control the flow of air through a particular vent 24.

The handheld sensor 18 is operable to detect the state of a user's hand. The handheld sensor 18 is configured to be gripped by the user, and may be mounted to a structure gripped by the user during vehicle 16 operation. For instance, the handheld sensor 18 may be fixedly mounted onto a steering wheel 40, or gear shifter 42. The handheld sensor 18 is in communication with the controller 22. It should be appreciated by those skilled in the art that the controller 22 may be the vehicle's 16 onboard engine control unit. The controller 22 processes the state of the hand so as to calculate a desired HVAC system operating setting within the cabin space 12 configured to optimize the user's comfort.

HVAC system operating setting as used herein refers to quantity and characteristic of air directed by the temperature of the air directed by the HVAC system 20. Other conditions included in the term HVAC system operating setting include where the air is directed. For instance, an HVAC system operating setting may include air heated to seventy-eight degrees, at maximum fan 26 speed, and directed only through the vents 24 disposed on the upper surface 32 of the instrument panel 28.

With reference now to FIG. 1, a preferred embodiment of the present invention is provided. In the preferred embodiment the handheld sensor 18 is fixedly mounted to structure found within the vehicle 16 configured to be gripped by the user, such as a steering wheel 40 and a gear shifter 42. The handheld sensor 18 is operable to detect the state of the user's hand. Specifically, the handheld sensor 18 is operable to detect the temperature and perspiration of the user's hand.

The system 10 may be fully automatic, meaning that the system 10 automatically generates a climate condition based upon the state of the user's hand. Specifically, the system 10 may further include a baseline 44. The baseline 44 is a predetermined climate condition calculated to make the user comfortable. The baseline 44 is programmed into the controller 22. The handheld sensors 18 transmit the state of the user's hand to the controller 22, to include the temperature of the hand and amount of perspiration detected on the hand. The controller 22 processes the state of the hand and the baseline 44 to calculate an HVAC system operating setting operable to generate the baseline 44. The controller 22 is further operable to actuate the HVAC system 20 so as to execute the calculated HVAC system operating setting.

For instance, assume the handheld sensors 18 detect that the user's hand is ninety degrees Fahrenheit, indicating a low body temperature. For illustrative purposes, also assume that the handheld sensor 18 detects that the user's hand has a relatively high amount of moisture. This information is transmitted to the controller 22, and the controller 22 processes the info nation to determine that the user is cold, and may be wet. Also assume that the baseline 44 climate is an ambient air temperature of seventy-four degrees Fahrenheit with a hand temperature of ninety-six degrees Fahrenheit. The controller 22 further processes the information and the predetermined baseline 44 so as to calculate an HVAC system 20 setting operable to establish the baseline 44 climate.

Figure 2:
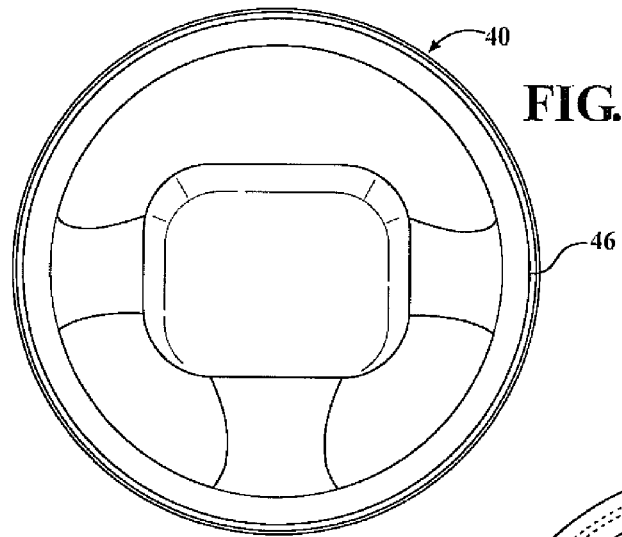
FIG. 2 is a perspective view showing an embodiment of a handheld sensor mounted onto the outer edge of a steering wheel.
Figure 3:
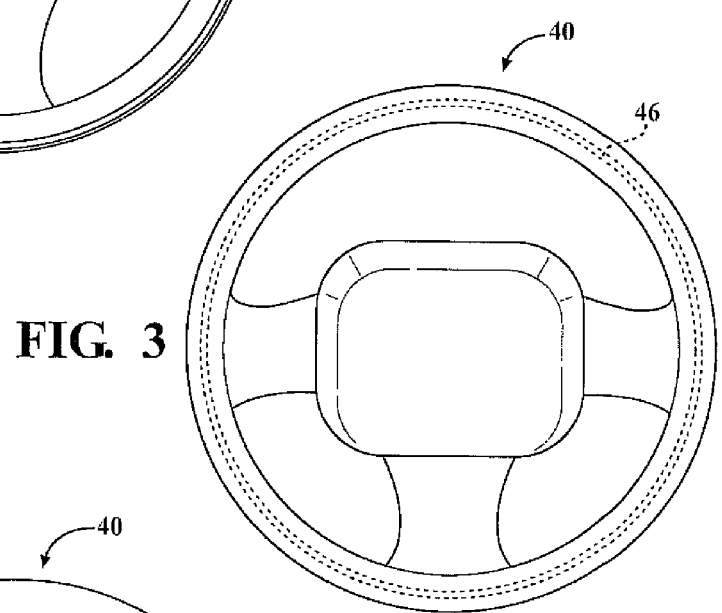
FIG. 3 is a perspective view showing an embodiment of a handheld sensor mounted on the back surface of the steering wheel.

With reference now to FIGS. 2-7, various embodiments of the handheld sensor 18 is provided. The handheld sensor 18 may be fixedly mounted to a structure configured to be gripped during operation of the vehicle 16, such as a steering wheel 40. The steering wheel 40 includes a front surface opposite a back surface. As shown in the Figures, the front surface is visible from the page. With reference specifically to FIGS. 2 and 3, the handheld sensor 18 is a continuous strip of material 46 disposed on the respective front and back surfaces of the steering wheel 40. The handheld sensor 18 may be formed from material operable to transmit a signal corresponding to a temperature such as a thermocouple material. Thermocouple material is currently known and used in the art and is operable to detect the temperature of the user's hand. The thermocouple material may be hardwired to the controller 22 so as to transmit an electrical signal to the controller 22 which corresponds with the temperature of the user's hand.

The handheld sensor 18 may further be operable to detect other parameters of the user's hands such as perspiration and the like. Perspiration sensors are currently known and used in the art, and any such perspiration sensor is adaptable for use herein including a capacitive operating sensing circuit having a charge transfer sensor coupled to a capacitive sensing electrode affixed to the front or back surface of the steering wheel 40.

Figure 4:
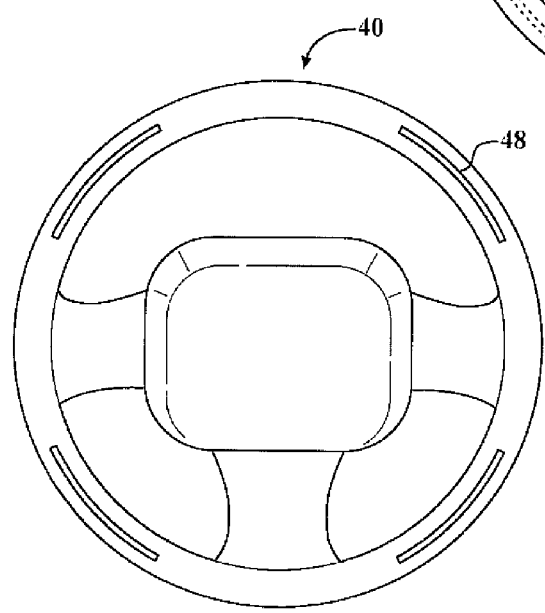
FIG. 4 is perspective view showing an embodiment of a handheld sensor mounted on the front surface of the steering wheels, wherein a plurality of handheld sensors are displaced equidistantly apart from each.
Figure 5:
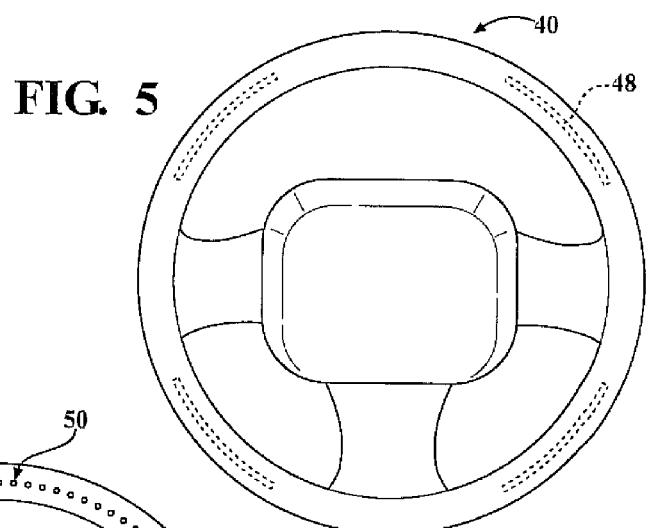
FIG. 5 is a view of FIG. 4 showing the handheld sensors disposed on the back surface of the steering wheel.
Figure 6:
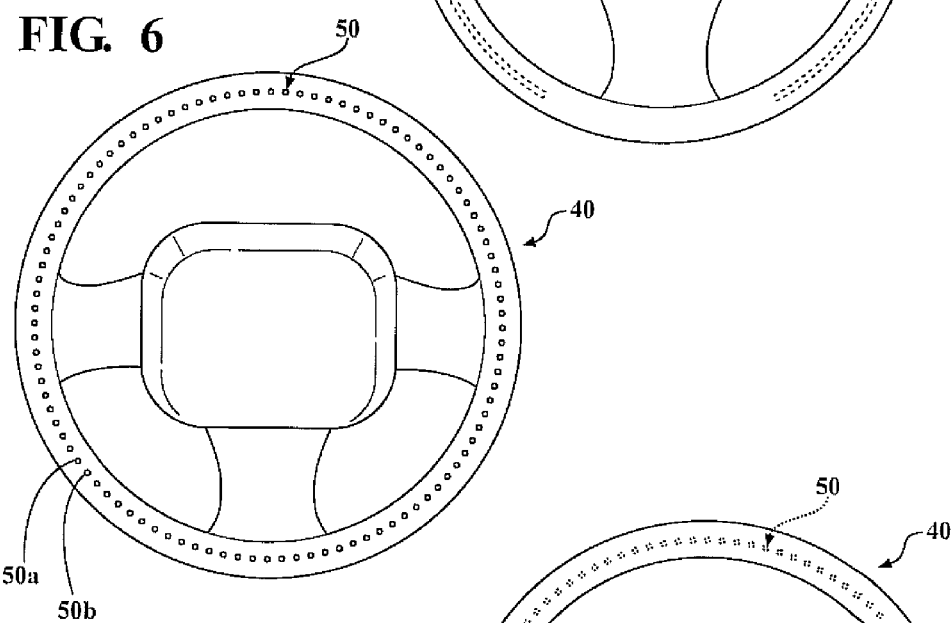
FIG. 6 is an embodiment of the present invention showing the handheld sensors formed by a plurality of pads disposed on the front surface of the steering wheel, some of the pads are operable to detect heat while others are operable to detect perspiration.
Figure 7:
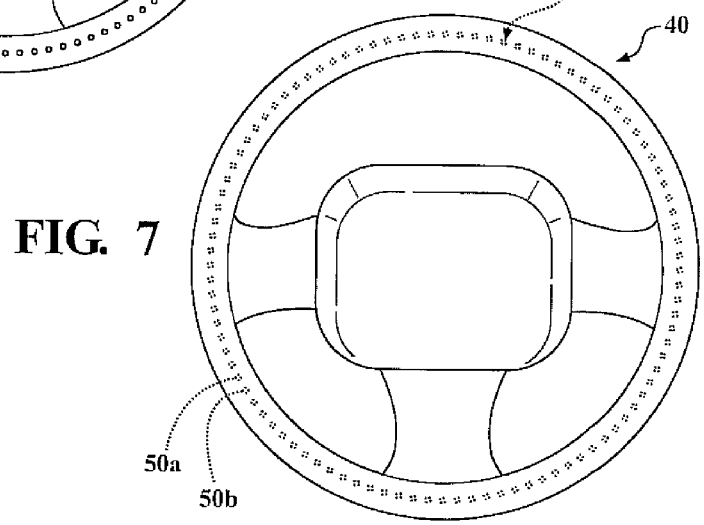
FIG. 7 shows the embodiment wherein the handheld sensors are pads disposed on the back surface of the steering wheel.

With reference now to FIGS. 4-7, other embodiments of the handheld sensor 18 are shown. With reference to FIG. 4, the handheld sensor 18 is shown as discrete strips 48 of thermocouple material displaced equidistantly apart from each other on the front surface of the steering wheel 40. FIG. 5 shows four discrete strips 48 of thermocouple material disposed on the back surface of the steering wheel 40, while FIGS. 6 and 7 show discrete pads 50 of thermocouple material disposed on the front and back of the steering wheel 40, respectively. The discrete pads 50 of thermocouple material are generally equidistant apart from each other and encompass the entire front portion of the front and back surfaces of the steering wheel 40. As is known to those skilled in the art, certain thermocouple material may be better for detecting temperature as opposed to detecting perspiration.

FIGS. 6 and 7 further show alternating thermocouple materials directed for detecting heat and perspiration. Specifically, the handheld sensors 18 are formed into discrete pads 50. Each pad is generally equidistant from the other. The pads may be formed from different thermocouple material and sequenced in an alternating manner. One of the thermocouple material 50a is operable to detect the temperature of the hand, while another thermocouple material 50b is operable to detect moisture/perspiration. The discrete pads 50 of material are in communication with the controller 22 and transmit to the controller 22 electric signals corresponding to the amount of perspiration and heat detected on the driver's hands.

Figure 8:
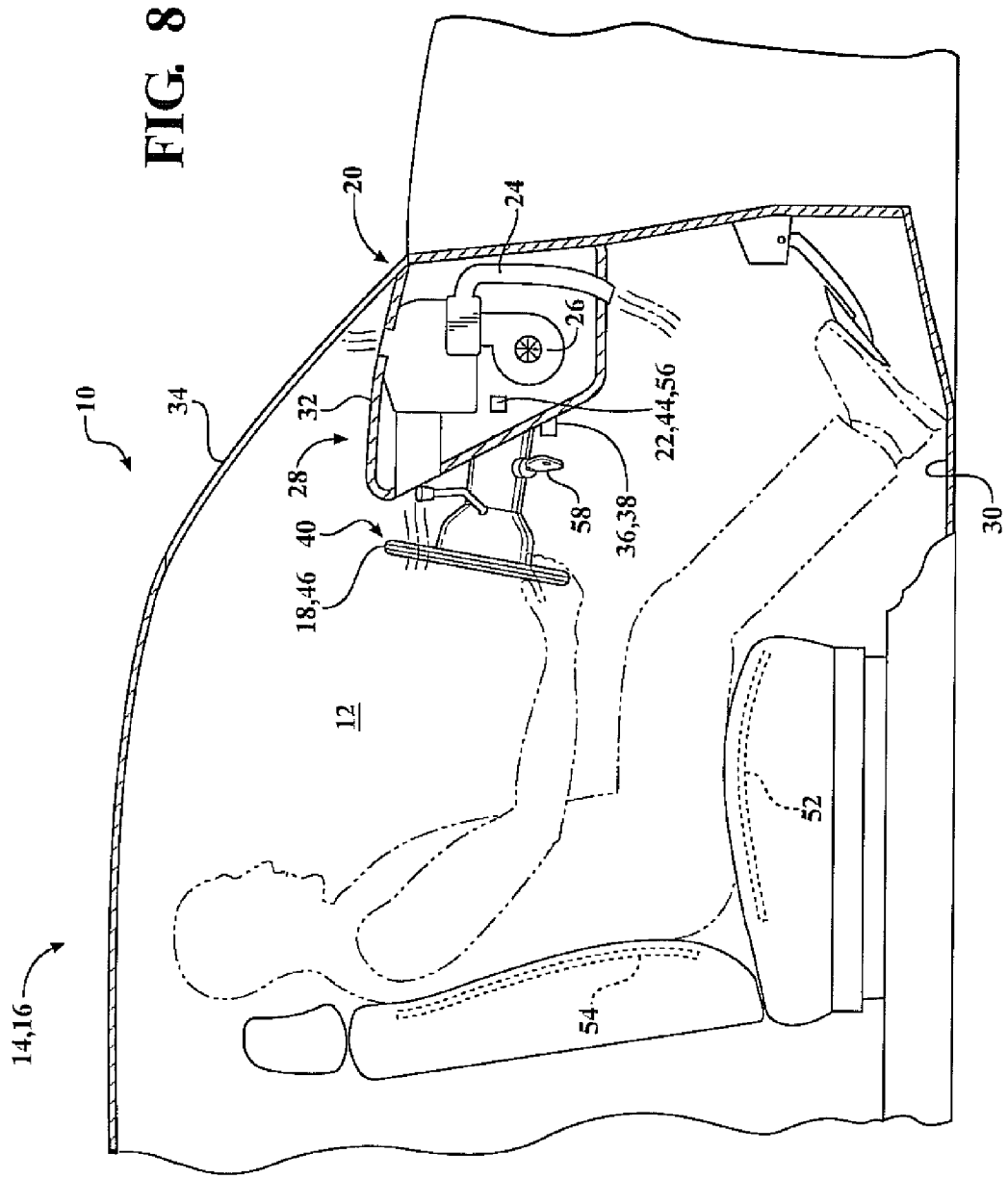
FIG. 8 is a perspective view of a climate control system showing the coolers and heaters and the fan.

With reference now to FIG. 8, a second preferred embodiment of the system 10 is provided. In the second preferred embodiment, the HVAC system 20 includes a seat heater 52 and seat cooler 54 operable to heat or cool a seat to a selected temperature. The input 36 is in communication with the controller 22 and operable to manually select the temperature of the seat. The seat heater 52 and seat cooler 54 are in communication with the controller 22 and the controller 22 processes the state of the hand to calculate an HVAC system operating setting operable to optimize the comfort of the user. The controller 22 proceeds to actuate the HVAC system 20, to include the seat heater 52 and seat cooler 54, and so as to generate the calculated HVAC system operating setting.

The HVAC system 20 may include and control other devices which attribute to the climate of the cabin space 12. For instance, the controller 22 may be further operable to process the state of the user's hand so as to adjust the speed of the fan 26 to generate the calculated HVAC system operating setting. In another example, the controller 22 may process the state of the user's hand to adjust the intensity of ambient light entering into the cabin space 12 of the vehicle 16. In platforms 14 having variable translucent windows 34, the controller 22 may process the state of the hand so as to adjust the transmissivity of the window 34 to generate the calculated climate. In instances where the system 10 detects that the temperature of the user's hand and the ambient light are above a predetermined threshold, the system 10 may actuate the seat cooler 54 and decrease the transmissivity of the window 34. Accordingly, the climate of the cabin space 12 may be controlled so as to optimize comfort for the user.

In operation, as the user engages the steering wheel 40 with either hand, the handheld sensors 18 are operable to detect the state of the hand and actuate the vehicle's 16 HVAC system 20 so as to generate a climate which maximizes the comfort of the user. Specifically, the handheld sensors 18 are operable to detect the temperature of the hand and any perspiration or moisture on the hand. This information is used to control the HVAC system 20, and other climate affecting devices such as seat heaters 52, seat coolers 54, or the transmissivity of the windows 34.

The system 10 may further include a database 56. The input 36 may be further operable transmit to the database 56 a user preference and to select a desired climate condition. The system 10 is operable to detect the state of the user's hand so as to adjust the HVAC system 20 and other climate affecting devices to optimize the comfort of the user in accordance with the baseline 44. Alternatively, the system 10 detects the state of the user's hand so as to adjust the HVAC system 20 and other climate affecting devices to optimize the comfort of the user in accordance with the user's preference. Thus, the system 10 may operate in a manner so as to tune a selected climate condition in accordance with the state of the user's hand or the user's preference.

For instance, the baseline 44 for optimizing the comfort of the user may be such that the temperature of the hand is ninety-eight degrees Fahrenheit. Accordingly, the system 10 processes the state of the user's hands so as to generate a climate within the cabin space 12 which maintains temperature of the user's hands at ninety-eight degrees Fahrenheit. The handheld sensor 18 is further operable to detect the perspiration of the user's hand. Accordingly, when the handheld sensor 18 detects that there is a certain amount of perspiration, the controller 22 may be operable to increase the speed of the fan 26 so as to help prevent the user from sweating.

The input 36 is further operable to provide a user preference. For instance, the user may actuate the input 36 so as to adjust the baseline 44 programmed in the controller 22. Assume the baseline is programmed to be ninety-eight degrees. Some users may find that they feel too warm when the controller 22 actuates the HVAC system 20 so as to maintain the user's hands at the programmed baseline 44. Accordingly, the user may actuate the input 36 so as to adjust the baseline 44 to ninety-six degrees. Thus, the controller 22 is operable to process the state of the hand so as to calculate an HVAC system operating setting configured to maintain the user's hands at ninety-six degrees Fahrenheit. It should be appreciated that the controller 22 is further operable to process the state of the hand so as to calculate an operating setting for other climate affecting devices such as seat heaters 52 and coolers. Such climate affecting devices are adjusted so as to maintain the user's hands at ninety-six degrees. Thus, the system 10 may accommodate a user preference so as to maintain the climate within the cabin either above or below programmed baselines 44.

The input 36 may also include an automatic recognition device 58 operable to automatically recognize a particular user and actuate the HVAC system 20 so as to maintain a climate optimal for the particular user's preferences. For instance, the input 36 may be a remote keyless entry adaptable for use with a specific driver. The keyless remote entry may communicate to the controller 22 that a particular user is operating the vehicle 16. The controller 22 processes the user's identification and actuates the HVAC system 20 so as to establish a climate within the cabin space 12 that is optimized to the particular user's comfort.

The database 56 may be further operable to store adjustments made by the user so as to establish a history of the user's preference. The history may be used to automatically adjust the HVAC settings so as to generate a climate condition within the cabin space 12 based upon the user's historical use. The system 10 may further include a sensor such as a thermometer operable to detect the ambient temperature of the environment outside the cabin space 12. The database 56 is further operable to associate a selected user preference with a particular environmental condition. Accordingly, the system 10 may automatically adjust the HVAC system operating settings so as to generate a climate condition previously selected by the user for a particular environmental temperature.

The system 10 may use other parameters of the state of the hand to adjust the climate condition within the cabin space 12. For instance, the system 10 may further include a sensor for detecting the position of the steering wheel 40. The position of the steering wheel 40 is transmitted to the controller 22 and the controller 22 is operable to process the position of the steering wheel 40 to determine whether or not the driver's hand is shaking. When the driver hand is shaking, the controller 22 may be further use of parameters of the hand, such as the temperature of the hand, to determine if the driver is cold. Assume that the sensors detect that the driver's hand is shaking and that the temperature of the hand is eighty-two degrees (below normal). The controller 22 is operable to process this information to determine that the driver is cold. Furthermore, assume that the driver actuates the input 36 to set the climate of the cabin to be seventy-four degrees.

The controller 22 is operable to process this selected temperature, along with the determination that the driver is cold so as to adjust the HVAC system operating settings to warm the driver as quickly as possible before maintaining an ambient cabin temperature of seventy-four degrees. For instance, the controller 22 may actuate the HVAC system 20 setting to begin to direct heated air from the floor vents 24 at a maximum fan 26 speed. The controller 22 may further actuate the seat heater 52 so as to warm the driver as quickly as possible. As the handheld sensor 18 detects that the hand is warming up and the driver has quit shaking, the controller 22 may actuate the HVAC systems 20 operating settings so as to reduce the temperature of the directed heat, reduce the fan 26 speed, and reduce the temperature of the seat heater 52. Accordingly, the system 10 may be operable to tune a setting already established by the user. Thus, as the user selects a climate condition within the cabin, the system 10 may tune the HVAC system operating settings so as to maintain maximum comfort to the user by detecting the state of the user's hands.

Figure 9:
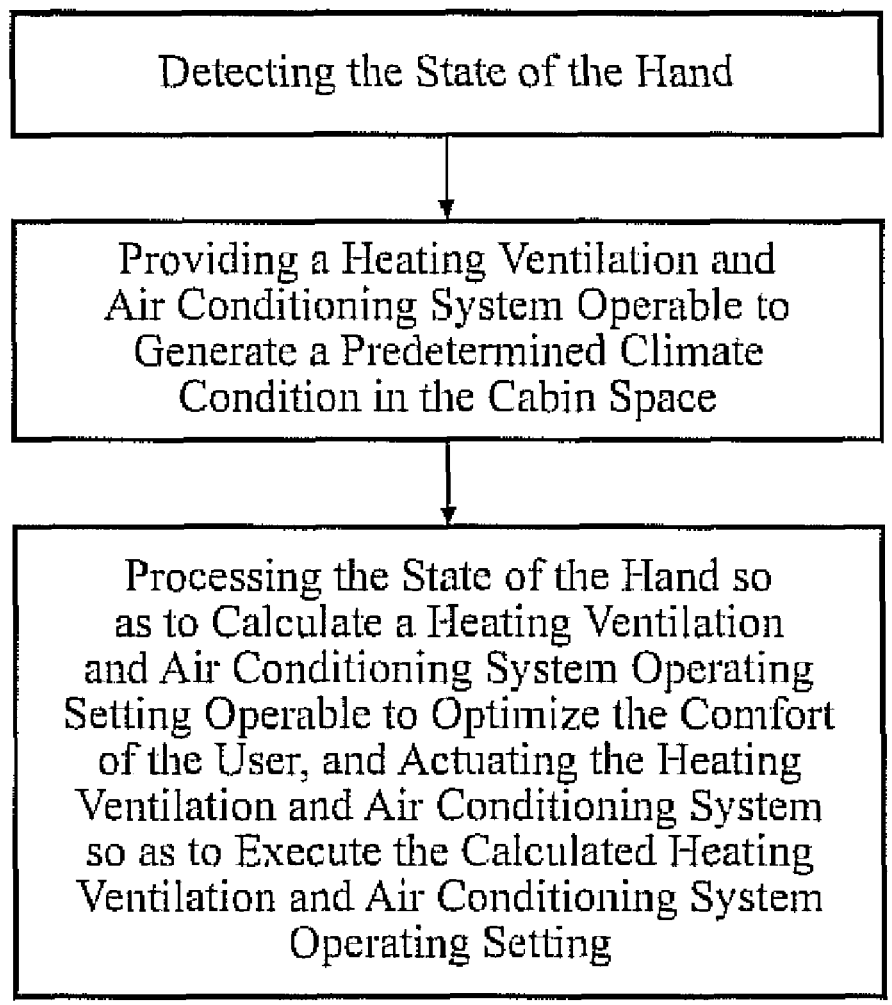
FIG. 9 is a diagram showing the steps for a method of controlling climate in a cabin space of the present invention.

With reference now to FIG. 9, a method for controlling climate in a cabin space 12 is provided. The method includes the step of providing a handheld sensor 18 for detecting the state of a hand and providing a HVAC system 20 operable to generate a climate condition within the cabin space 12. The method proceeds to processing the state of the hand so as to calculate a HVAC system operating setting operable to maximize the user's comfort. The method proceeds to actuating the HVAC system 20 in accordance with the calculated HVAC system operating setting.

The method may further include the step of mounting the handheld sensor 18 onto the wheel, the handheld sensor 18 operable to detect the temperature of the hand and the perspiration of the hand. The method may further include the step of providing an input 36 operable to manually adjust the HVAC system 20 and providing a seat heater 52 and seat cooler 54 operable to heat or cool a seat to a predetermined temperature operable to make the user comfortable.

The method may further include the step of processing the temperature and perspiration of the hand to so as to calculate a HVAC system operating setting operable to maximize the user's comfort. The HVAC system operating setting may further include the operating settings of the seat heater 52, seat cooler 54, and a fan 26. The state of the user's hand may be used to adjust the seat heater 52, seat cooler 54, and fan 26 so as to optimize the comfort of the user. The method may further include the step of identifying a user preference and adjusting the HVAC system operating setting so as to generate a climate condition within the cabin space 12 that is based upon the user preference.

Obviously, many modifications and variations of the present invention are possible in light of the above teachings and may be practiced otherwise than as specifically described while within the scope of the appended claims.

The invention claimed is:

1. A system for controlling the climate in a cabin space so as to optimize the comfort of a user, the system comprising:
   a controller;
   a heating ventilation and air conditioning system operable to generate a predetermined climate condition the cabin space; and
   a handheld sensor configured to be gripped and operable to detect the temperature of a hand, the handheld sensor in communication with the controller, the controller processing the state of the hand so as to calculate a heating ventilation and air conditioning system operating setting operable to optimize the comfort of the user, and actuating the heating ventilation and air conditioning system so as to execute the calculated heating ventilation and air conditioning system operating setting.

2. The system as set forth in claim 1, wherein the handheld sensor is fixedly mounted to a steering wheel having a front surface opposite a back surface.

3. The system as set forth in claim 2, wherein the handheld sensor is a continuous strip of material disposed on the back surface of the steering wheel.

4. The system as set forth in claim 2, wherein the handheld sensor is a plurality of discrete strips of material disposed on both the back and front surface of the steering wheel.

5. The system as set forth in claim 1, further including an input operable by the user to manually adjust the heating ventilation and air conditioning system.

6. The system as set forth in claim 5, further including a baseline, the baseline is a predetermined climate condition calculated to make the user comfortable.

7. The system as set forth in claim 6, wherein the input is further operable by the user to manually adjust the baseline.

8. The system as set forth in claim 7, wherein the system further includes a database in communication with the input and the controller, the input operable to transmit a user preference to the database, the controller operable to process the user preference and the state of the hand so as to calculate a heating ventilation and air conditioning system operating setting operable to optimize the comfort of the user.

9. The system as set forth in claim 8, further including an automatic recognition device operable to automatically recognize a particular user, the controller processing the user preference of the recognized user and actuate the heating ventilation and air conditioning system so as to maintain a climate optimal for the preferences of the recognized user.

10. The system as set forth in claim 1, wherein the heating ventilation and air conditioning system further includes a seat heater operable to heat a seat, the controller actuating the seat heater so as to execute the calculated heating ventilation and air conditioning system operating setting.

11. The system as set forth in claim 1, wherein heating ventilation and air conditioning system further includes a seat cooler operable to cool a seat, the controller actuating the seat cooler so as to execute the calculated heating ventilation and air conditioning system operating settings.

12. The system as set forth in claim 1, wherein the heating ventilation and air conditioning system further includes a fan, the controller actuating the fan so as to execute the calculated heating ventilation and air conditioning system operating settings.

13. The system as set forth in claim 1, wherein the handheld sensor is mounted onto a gear shifter.

14. A method for controlling the climate in a cabin space, the method comprising the steps of:
   detecting a temperature of a hand by gripping a handheld sensor;
   providing a heating ventilation and air conditioning system operable to generate a predetermined climate condition in the cabin space; and
   processing the temperature of the hand so as to calculate a heating ventilation and air conditioning system operating setting operable to optimize the comfort of the user, and actuating the heating ventilation and air conditioning system so as to execute the calculated heating ventilation and air conditioning system operating setting.

15. The method as set forth in claim 14, further including the step of mounting the sensor onto a steering wheel.

16. The method as set forth in claim 15, further including providing an input operable to manually adjust the heating ventilation and air conditioning system.

17. The method as set forth in claim 16, further including the step of storing a user preference, and processing the user preference and the state of the hand so as to calculate a heating ventilation and air conditioning system operating setting operable to optimize the comfort of the user, and actuating the heating ventilation and air conditioning system so as to execute the calculated heating ventilation and air conditioning system operating setting.

18. A system for controlling the climate in a cabin space so as to optimize
   the comfort of a user, the system comprising:
   a controller;
   a heating ventilation and air conditioning system operable to generate a predetermined climate condition the cabin space; and
   a handheld sensor configured to be gripped and operable to detect the amount of perspiration on a hand, the handheld sensor in communication with the controller, the controller processing the state of the hand so as to calculate a heating ventilation and air conditioning system operating setting operable to optimize the comfort of the user, and actuating the heating ventilation and air conditioning system so as to execute the calculated heating ventilation and air conditioning system operating setting.

19. A method for controlling the climate in a cabin space, the method comprising the steps of:
   detecting the amount of perspiration on a hand by gripping a handheld sensor;
   providing a heating ventilation and air conditioning system operable to generate a predetermined climate condition in the cabin space; and processing the perspiration of the hand so as to calculate a heating ventilation and air conditioning system operating setting operable to optimize the comfort of the user, and actuating the heating ventilation and air conditioning system so as to execute the calculated heating ventilation and air conditioning system operating setting.

* * * * *